(12) United States Patent
Horn

(10) Patent No.: US 8,601,313 B1
(45) Date of Patent: Dec. 3, 2013

(54) SYSTEM AND METHOD FOR A DATA RELIABILITY SCHEME IN A SOLID STATE MEMORY

(75) Inventor: Robert L. Horn, Yorba Linda, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 406 days.

(21) Appl. No.: 12/966,892

(22) Filed: Dec. 13, 2010

(51) Int. Cl.
*G06F 11/00* (2006.01)

(52) U.S. Cl.
USPC .......................................................... 714/6.32

(58) Field of Classification Search
USPC .......................................................... 714/6.32
See application file for complete search history.

(56) References Cited

U.S. PATENT DOCUMENTS

| | | | |
|---|---|---|---|
| 5,408,644 A | 4/1995 | Schneider et al. | |
| 5,499,337 A | 3/1996 | Gordon | |
| 6,467,022 B1 | 10/2002 | Buckland et al. | |
| 6,523,087 B2 | 2/2003 | Busser | |
| 6,959,413 B2 | 10/2005 | Humlicek et al. | |
| 7,069,382 B2 | 6/2006 | Horn et al. | |
| 7,200,715 B2 | 4/2007 | Kleiman et al. | |
| 7,409,492 B2 * | 8/2008 | Tanaka et al. | 711/103 |
| 7,640,390 B2 * | 12/2009 | Iwamura et al. | 711/103 |
| 7,653,778 B2 | 1/2010 | Merry, Jr. et al. | |
| 7,779,294 B2 | 8/2010 | Corrado et al. | |
| 7,856,528 B1 | 12/2010 | Frost et al. | |
| 8,321,597 B2 * | 11/2012 | Yu et al. | 710/5 |
| 8,402,217 B2 | 3/2013 | Burd | |
| 2004/0015657 A1 | 1/2004 | Humlicek et al. | |
| 2004/0123032 A1 | 6/2004 | Talagala et al. | |
| 2005/0066124 A1 | 3/2005 | Horn et al. | |
| 2005/0086429 A1 | 4/2005 | Chatterjee et al. | |
| 2005/0177672 A1 | 8/2005 | Rao | |
| 2006/0004957 A1 | 1/2006 | Hand, III et al. | |
| 2006/0236029 A1 | 10/2006 | Corrado et al. | |
| 2007/0268905 A1 | 11/2007 | Baker et al. | |
| 2007/0283079 A1 | 12/2007 | Iwamura et al. | |
| 2007/0294565 A1 | 12/2007 | Johnston et al. | |
| 2007/0297265 A1 | 12/2007 | Kim et al. | |
| 2008/0133969 A1 | 6/2008 | Manoj | |
| 2008/0141054 A1 | 6/2008 | Danilak | |
| 2008/0155160 A1 | 6/2008 | McDaniel | |
| 2008/0229148 A1 | 9/2008 | Forhan et al. | |
| 2008/0276124 A1 | 11/2008 | Hetzler et al. | |
| 2009/0073762 A1 | 3/2009 | Lee et al. | |
| 2009/0083504 A1 | 3/2009 | Belluomini et al. | |
| 2009/0150599 A1 | 6/2009 | Bennett | |
| 2009/0172335 A1 | 7/2009 | Kulkarni et al. | |

(Continued)

FOREIGN PATENT DOCUMENTS

WO  WO 2010049928 A1  5/2010

*Primary Examiner* — Bryce Bonzo

(57) ABSTRACT

Embodiments of the present invention use high granularity reliability information (e.g., from individual pages, blocks, etc.) in a solid state storage device to vary the number of elements in each RAID stripe and to combine the elements in a stripe to achieve a more homogenous reliability metric across the device. In one embodiment, a reliability metric of a stripe group of storage elements is calculated based on monitored conditions of the storage elements such as erase counts, number of bit errors encountered, calculated voltage reference values, etc. The reliability metrics of the stripe groups are used to decide how many storage elements and which storage elements should be combined in the redundant RAID stripes to achieve a desired probability of data loss for the overall device. The target error probability could be fixed for the life of the storage device or adjusted as the device wide error rates increase.

19 Claims, 9 Drawing Sheets

| Stripe Group | No. Elements | Reliability Metric Target Met? |
|---|---|---|
| 1 | 9 | Yes |
| 2 | 9 | No |
| 3 | 8 | Yes |

Before Re-Distribution or Elimination of Elements with Low Reliability

(56) References Cited

U.S. PATENT DOCUMENTS

| | | |
|---|---|---|
| 2009/0204852 A1 | 8/2009 | Diggs et al. |
| 2009/0210744 A1 | 8/2009 | Kamalavannan |
| 2009/0248998 A1 | 10/2009 | Sato et al. |
| 2009/0327604 A1 | 12/2009 | Sato et al. |
| 2009/0327803 A1 | 12/2009 | Fukutomi et al. |
| 2010/0049914 A1 | 2/2010 | Goodwin |
| 2010/0064111 A1* | 3/2010 | Kunimatsu et al. ............ 711/161 |
| 2010/0088557 A1* | 4/2010 | Weingarten et al. .......... 714/704 |
| 2010/0088579 A1 | 4/2010 | Hafner et al. |
| 2010/0115175 A9 | 5/2010 | Zhuang et al. |
| 2010/0122115 A1 | 5/2010 | Olster |
| 2010/0169543 A1 | 7/2010 | Edgington et al. |
| 2010/0262773 A1 | 10/2010 | Borchers et al. |
| 2010/0281202 A1* | 11/2010 | Abali et al. .................... 711/103 |
| 2011/0035548 A1* | 2/2011 | Kimmel et al. ................ 711/114 |
| 2011/0126045 A1* | 5/2011 | Bennett ........................ 714/6.22 |
| 2011/0173484 A1 | 7/2011 | Schuette et al. |
| 2011/0191649 A1 | 8/2011 | Lim et al. |
| 2011/0219259 A1 | 9/2011 | Frost et al. |
| 2011/0264843 A1 | 10/2011 | Haines et al. |
| 2011/0314218 A1 | 12/2011 | Bert |
| 2012/0079318 A1* | 3/2012 | Colgrove et al. ............. 714/6.22 |
| 2012/0110376 A1* | 5/2012 | Dreifus et al. ................ 714/6.12 |
| 2012/0151253 A1 | 6/2012 | Horn |
| 2012/0173790 A1 | 7/2012 | Hetzler et al. |
| 2012/0233406 A1 | 9/2012 | Igashira et al. |
| 2012/0246403 A1 | 9/2012 | McHale et al. |

* cited by examiner

Reliability Data

| Erase Count |
|---|
| No. of Bit Errors |
| Vref Value |
| ... |
|  |

RELIABILITY METRIC

| Stripe Group 3 | Reliability - 98 |
| Stripe Group 1 | Reliability - 84 |
| Stripe Group 2 | Reliability - 72 |
| Stripe Group 6 | Reliability - 64 |

Reliability Target = 60

| Stripe Group 4 | Reliability - 29 |
| Stripe Group 5 | Reliability - 14 |

FIGURE 3

Before Re-Distribution or Elimination of Elements with Low Reliability

After Re-Distribution

Element Eliminated from Stripe Group 2

| Stripe Group | No. Elements | Reliability Metric Target Met? |
|---|---|---|
| 1 | 9 | Yes |
| 2 | 7 | Yes |
| 3 | 8 | Yes |
| | | |

After Elimination of Elements with Low Reliability

SYSTEM AND METHOD FOR A DATA RELIABILITY SCHEME IN A SOLID STATE MEMORY

BACKGROUND

Many data storage components such as hard disks and solid state drives have certain advertised reliability guarantees that the manufacturers provide to customers. For example, certain solid state drive manufacturers guarantee a drive failure rate of $10^{-16}$ or $10^{-17}$. To increase data reliability, a data redundancy scheme such as RAID (Redundant Arrays of Independent Disks) is used to increase storage reliability. The redundancy may be provided by combining multiple storage elements within the storage device into groups providing mirroring and/or error checking mechanisms. For example, various memory blocks of a solid state storage device may be combined into stripe groups in which user data is stored.

BRIEF DESCRIPTION OF THE DRAWINGS

Systems and methods which embody the various features of the invention will now be described with reference to the following drawings, in which:

FIG. 3 illustrates an example collection of stripe groups sorted by their associated reliability metrics.

DETAILED DESCRIPTION

Figure 1:
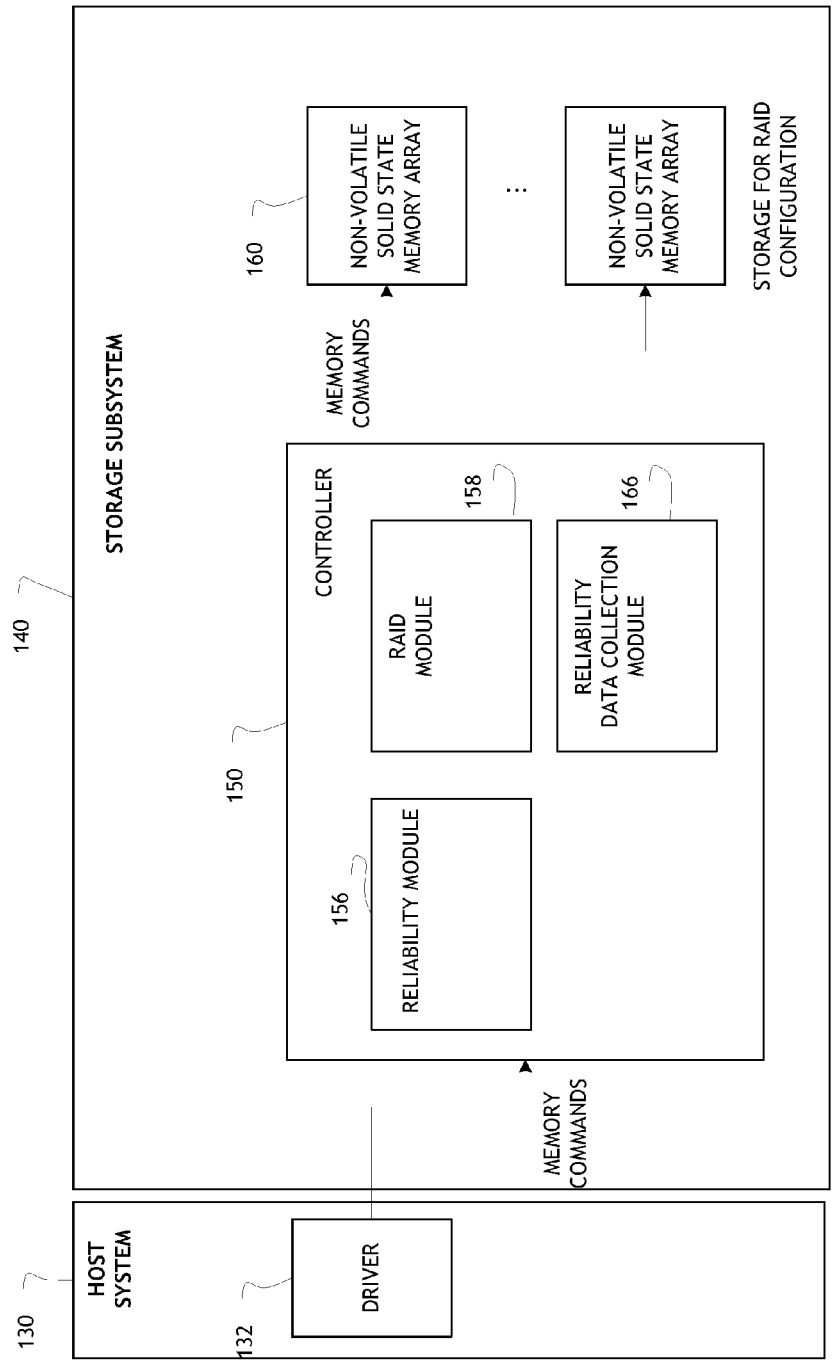
FIG. 1 is a block diagram illustrating a storage subsystem implementing a data reliability scheme according to one embodiment.

While certain embodiments of the inventions have been described, these embodiments have been presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

Overview

Embodiments of the invention are directed to using reliability information about individual storage or data path elements in a solid state storage devices (e.g., page, block, plane, device, channel, etc.) to optimize the number and/or grouping of elements in a redundant RAID configuration to maximize data reliability.

A common approach to overcome storage element failure is to use redundant RAID (mirroring, parity, etc.) to allow data recovery should one or more failures occur. Typically, the degree of redundancy is chosen based on an estimated Mean Time Between Failures (MTBF) of the component storage elements (i.e., disk drives, memory chips, etc.). If the reliability of a component device is compromised, the device must be replaced or the capacity of the system must be reduced to maintain the required system-level MTBF.

For example, in the standard hard disk drive (HDD) RAID configuration, the host system generally expects individual sector read errors to be randomly distributed across all HDD's. Thus, the matching of sectors from different HDD's into redundant stripes is generally a fixed function by LBA value. For example, sector 1 from each HDD in the RAID set make a first redundant stripe, sector 2 from each HDD make a second redundant stripe, and so on. If sector 1 from HDD 1 and sector 1 from HDD 2 happen to be less reliable, stripe 1 is inherently less reliable than stripe 2 and more likely to cause loss of user data. Also, because of fixed geometry mapping (stripes determined mathematically by LBA), a set level of redundancy is implemented and cannot be adjusted to deal with localized sectors that are less reliable.

In various embodiments of the invention, the fixed geometry mapping of RAID stripes in HDD is replaced by dynamic grouping of storage elements in a solid state storage device into RAID stripe groups. Embodiments of the present invention use high granularity reliability information (e.g., from individual pages, blocks, etc.) that is available in a solid state storage device to vary the number of elements in each RAID stripe and to more intelligently combine the elements in a RAID stripe to achieve a more homogenous RAID stripe reliability metric across the storage device.

In one embodiment, a reliability metric of a stripe group comprising various storage elements is calculated based on one or more monitored conditions of the storage elements such as erase counts, number of bit errors encountered in a data access operation (e.g., the last read operation), calculated voltage reference values, etc. The reliability metrics of the stripe groups could be used to decide how many storage elements and which storage elements should be combined in the redundant RAID stripes to achieve a desired probability of data loss for the overall storage device. The target error probability could be fixed for the life of the storage system or adjusted as the system wide error rates increase.

System Overview

FIG. 1 is a block diagram illustrating a storage subsystem implementing a data reliability scheme according to one embodiment. As shown, a storage subsystem 140 includes a controller 150 and one or more non-volatile solid-state memory arrays 160. The controller 150 in one embodiment in turn includes a reliability module 156, a RAID module 158, and a reliability data collection module 166. In other embodiments, the three modules may be separated into additional modules or combined into fewer modules. In one embodiment, the RAID module 158 is configured to execute data access commands to maintain a data redundancy scheme in the storage subsystem. For example, the RAID module 158 may maintain data on which storage elements are assigned to a RAID stripe group. The reliability data collection module 166 in one embodiment is configured to monitor a number of conditions in the storage elements within the one or more non-volatile solid-state memory arrays 160. The monitored conditions may be indicative of any potential data access errors in the individual storage elements and may include conditions such as erase counts, number of bit errors encountered in a data access operation (e.g., the last read operation), calculated voltage reference values, etc. The reliability module 156 in one embodiment periodically determines the reliability metrics of the individual stripe groups. In one embodiment, the reliability module 156 uses the monitored conditions of particular elements assigned to a stripe group to determine a reliability metric of the stripe group. For example, a stripe group's reliability metric may be based on the erase counts of all blocks assigned to the stripe group. In addition to determining reliability metrics, the reliability module 156 also performs a number of methods to periodically adjust the data redundancy configuration, as further described below. In one embodiment, the reliability module 156 performs the corrective actions by directing the RAID module 158 to issue certain commands to reconfigure the RAID. In another embodiment, the reliability module 156 performs the corrective actions directly. For the sake of simplicity, the corrective actions discussed below will be described as being performed by the reliability module 156.

In one embodiment, the controller 150 of the storage subsystem 140 is configured to receive and execute commands from a device driver 132 in a host system 130. The memory commands from the driver 132 may include write and read commands issued by the host system 130. As further shown in FIG. 1, in one embodiment, the controller 150 executes the received commands in one or more non-volatile solid-state memory arrays 160.

Although this disclosure uses RAID as an example, the systems and methods described herein are not limited to the RAID redundancy schemes and can be used in any data redundancy configuration that utilizes striping and/or grouping of storage elements for mirroring or error checking purposes. In addition, although RAID is an acronym for Redundant Array of Independent Disks, those skilled in art will appreciate that RAID is not limited to storage devices with physical disks and is applicable to a wide variety of storage devices including the non-volatile solid state devices described herein.

Reliability Monitoring Examples

Figure 2A:
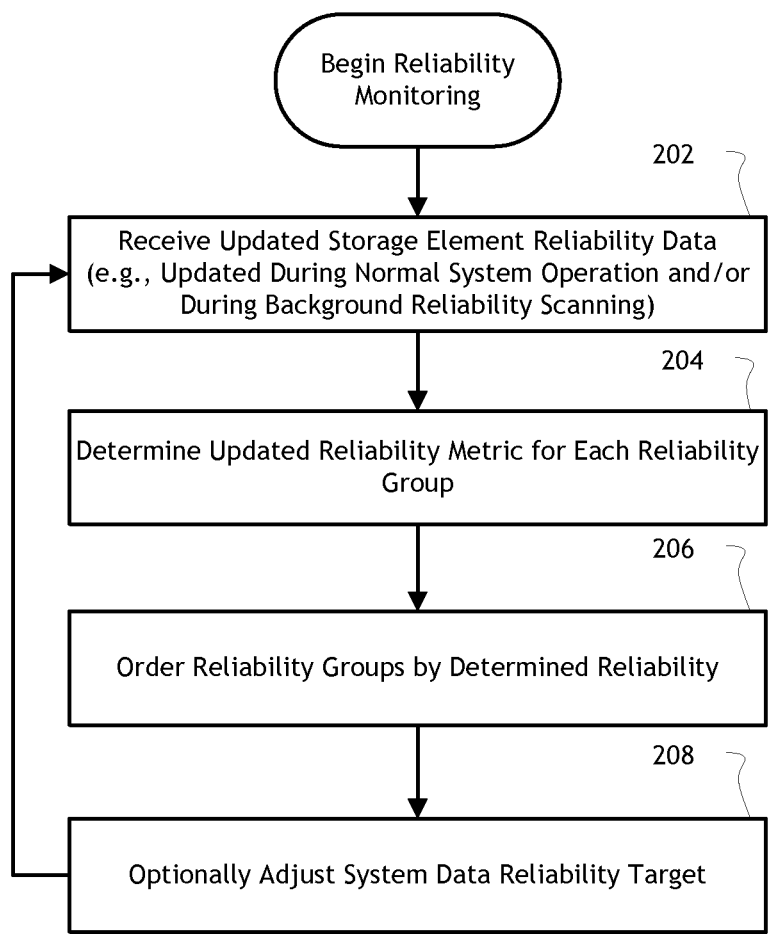
FIG. 2A is flow diagram showing a process of reliability monitoring according to one embodiment.

FIG. 2A is flow diagram showing a process of reliability monitoring performed by the reliability module 156 according to one embodiment. In block 202, the reliability module 156 receives updated storage element reliability data collected by the reliability data collection module 166. In one embodiment, the data may be collected, for example, during normal system operation and/or during background reliability scanning. In block 204, the reliability module 156 determines an updated reliability metric for each reliability group. In block 206, the reliability module 156 orders stripe groups by their determined reliability metrics. In block 208, the reliability module 156 optionally adjusts system data reliability target. In one embodiment, the data reliability target is a threshold against which the reliability metric of each stripe group is measured. As will be further discussed below, corrective actions are taken when one or more stripe groups have reliability metrics that are below the data reliability target. As will be further discussed in conjunction with FIGS. 4A and 4B, the reliability target is adjusted over time in accordance with the observed reliability metrics of the stripe groups in the storage subsystem.

Figure 2B:
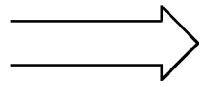
FIG. 2B illustrates example data elements that are used in a reliability metric determination according to one embodiment.

FIG. 2B illustrates example data elements that are used in a reliability metric determination according to one embodiment. As shown, one or more monitored conditions indicative of reliability are used to generate a reliability metric. For example, one or more of erase counts, number of bit errors in recent data access operations such as ECC (error correction code) errors, and calculated voltage reference values of the physical memory can be used to generate the reliability metric. The voltage reference values may vary depending on the flash memory devices used in the solid state storage subsystem. Flash memory devices typically store information in an array of memory cells constructed with floating gate transistors. In single-level cell (SLC) flash devices, each cell stores a single bit of information. In multi-level cell (MLC) devices, each cell stores two or more bits of information. When a read operation is performed, the electrical charge levels of the cells are compared to one or more voltage reference values (also called "voltage thresholds" or "threshold levels") to determine the state of each cell. In SLC devices, each cell is read using a single voltage reference value. In MLC devices, each cell is read using multiple voltage references values. The electrical charge levels are known to change slowly over time and affect read operations and the voltage reference values need to be adjusted accordingly to ensure proper read results. Therefore, the calculated voltage reference values can be used as an indication of reliability.

The reliability metric may be determined in a number of ways. For example, a normalized score may be assigned to each storage element in a stripe group based on one or more of the monitored conditions of each element, and the reliability metric of the stripe group may be a sum or average of all scores received by the storage elements assigned to the stripe group. The process of monitoring these conditions and extracting data indicative of reliability is described in the following commonly owned patent applications, the disclosures of which are hereby incorporated by reference: (1) "SYSTEMS AND METHODS FOR MEASURING THE USEFUL LIFE OF SOLID-STATE STORAGE DEVICES," U.S. patent application Ser. No. 11/429,936, now U.S. Pat. No. 7,653,778, and (2) "SOLID STATE STORAGE SUBSYSTEM THAT MAINTAINS AND PROVIDES ACCESS TO DATA REFLECTIVE OF A FAILURE RISK," U.S. patent application Ser. No. 12/027,965.

FIG. 3 illustrates an example collection of stripe groups sorted by their associated reliability metrics, for example, as a result of the action performed in block 206 of FIG. 2A. As shown, a number of stripe groups have reliability metrics ranging from 14 to 98. Four example groups in FIG. 3 have reliability metrics that are above the reliability target of 60 and two groups have reliability metrics that are below the reliability target. In one embodiment, sorting the groups by their reliability metrics enables the reliability module 156 to determine which groups are below the reliability target and in need of corrective actions. In other embodiments, other types of tracking methods are performed to determine the groups that are above or below the reliability target. For example, a linked list or other data structures may be maintained to organize the groups by their reliability metrics.

Storage Element Distribution

Figure 4A:
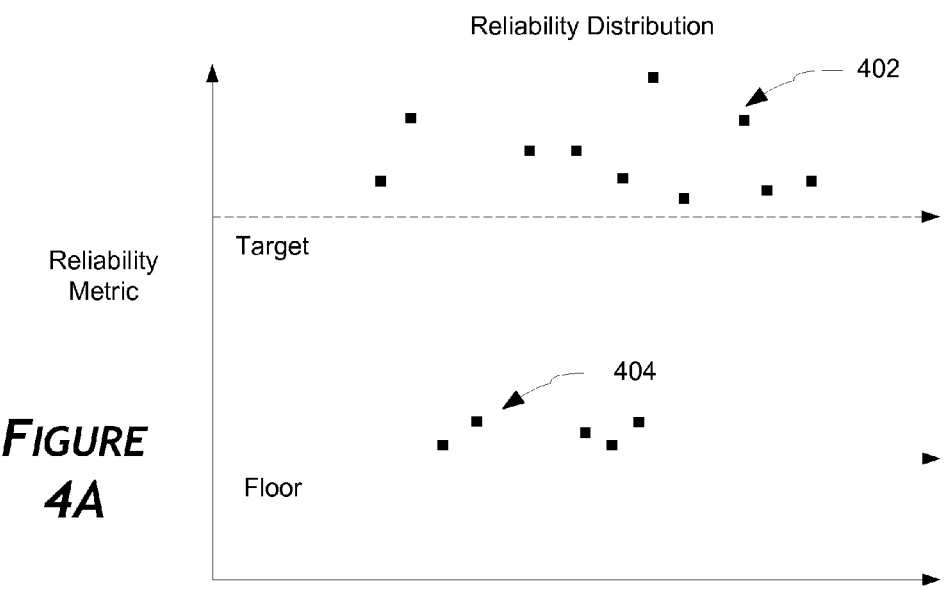
FIGS. 4A and 4B illustrate example stripe group distribution by their associated reliability metrics.
Figure 4B:
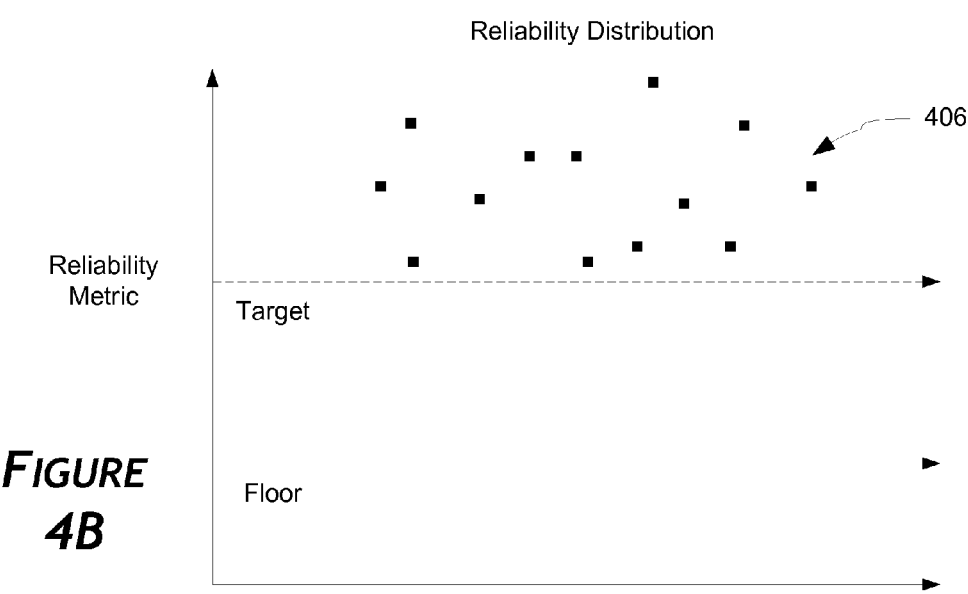

FIGS. 4A and 4B illustrate example stripe group distributions by their associated reliability metrics. Shown in the graph of FIG. 4A is an example cluster 402 of stripe groups having reliability metrics above the reliability target and an example cluster 404 of stripe groups having reliability metrics substantially below the reliability target. In fact, the example cluster 404 is very near a floor reliability metric that indicates imminent data failure. The scenario of FIG. 4A can occur as certain storage elements degrade over time and have their reliability metrics drift closer and closer to the floor. Indeed, even with newly manufactured solid state devices, certain storage elements (e.g., pages, blocks, planes, etc.) may be more susceptible to failures than others. Therefore, a stripe group including those storage elements may have a reliability metric that is close to the floor.

However, the scenario of FIG. 4A can be prevented by various embodiments of the invention. In one embodiment, the reliability module 156 is configured to take corrective actions with respect those stripe groups with reliability metrics that are detected in periodic monitoring to be below the target. In one embodiment, storage elements from those stripe groups that are below the reliability target are exchanged with storage elements from those stripe groups that are above the target. For example, using the example groups from FIG. 3, the reliability module 156 may take certain storage elements from stripe group 3 (with a reliability metric of 98) and re-assign them to stripe group 4 (with a reliability metric of 29) and vice versa. In particular, storage elements with high reliability from stripe group 3 may be re-assigned to stripe group 4 and storage elements with low reliability from stripe group 4 may be re-assigned to stripe group 3. The exchange of elements (e.g., page, blocks, etc.) between groups 3 and 4 has the effect of normalizing the reliability metrics of both groups. Thus, after the exchange, stripe group 3 may end up with a reliability metric of 64 and stripe group 4 may end up with a reliability metric of 63. Now both groups have reliability metrics that are over the target of 60.

Returning to FIG. 4A, the reliability module 156 may perform normalization on the stripe groups by re-distributing storage elements assigned to stripe groups in the cluster 404 to stripe groups in the cluster 402, and vice versa. In one embodiment, the cluster 404 is prevented from drifting close to the floor by periodic monitoring and normalization so that any stripe group that drifts below the target is normalized at first detection.

FIG. 4B illustrates the effect after normalization, where all stripe groups in cluster 406 are now above the reliability target. In one embodiment, the normalization is periodically performed over time to ensure that no one stripe group is below the target for an extended period of time. In one embodiment, the target is set at a distance away from the floor as shown in FIG. 4B so that no one stripe group is near the floor. Since storage elements tend to degrade over time, FIG. 4B also illustrates the adjustment of the reliability target as previously discussed in block 208 of FIG. 2. Compared to FIG. 4A, the reliability target in FIG. 4B has been lowered. Indeed, over the life of the storage device, the reliability module 156 in one embodiment is configured to periodically adjust the target by progressively lowering it. This is because the target is typically set as high as possible when the device is new. As discussed above, stripe groups are normalized around the target and it is thus desirable to have their reliability metrics to be as far from the floor as possible. Storage elements from newly manufactured devices tend to be able to support this high reliability target. However, after the storage elements are degraded later due to use, there will be insufficient storage elements to maintain normalization around a high target.

The concept of progressively adjusting the reliability target can be further illustrated using the simplified example of FIG. 3. At some point in time after repeated use and stripe group normalization, all the example stripe groups will have reliability metrics below the reliability target of 60 and re-distribution of storage elements will no longer bring the metrics of all groups above 60. In this situation, the target may be adjusted downward to 50. In this manner, the target is progressively adjusted downward to ensure that there are sufficient storage elements to achieve normalization of the stripe groups. The progressive downward adjustment of the target ensures that the stripe groups degrade in an orderly fashion over time toward a potential failure and that no one stripe group would reach the point of potential failure pre-maturely. In one embodiment, the reliability module 156 is configured to analyze the monitored conditions and/or reliability metric distribution information such as that depicted in FIGS. 4A and 4B to determine whether a downward adjustment is appropriate.

At some point, however, this progressive downward adjustment of the reliability target will not be possible due to the fact that the target is near the floor. In that case, as will be further described in FIG. 5, the reliability module 156 in one embodiment is configured to remove certain elements with low reliability from use to boost the reliability metrics of the groups to which those elements are assigned.

Normalization of Stripe Groups

Figure 5:
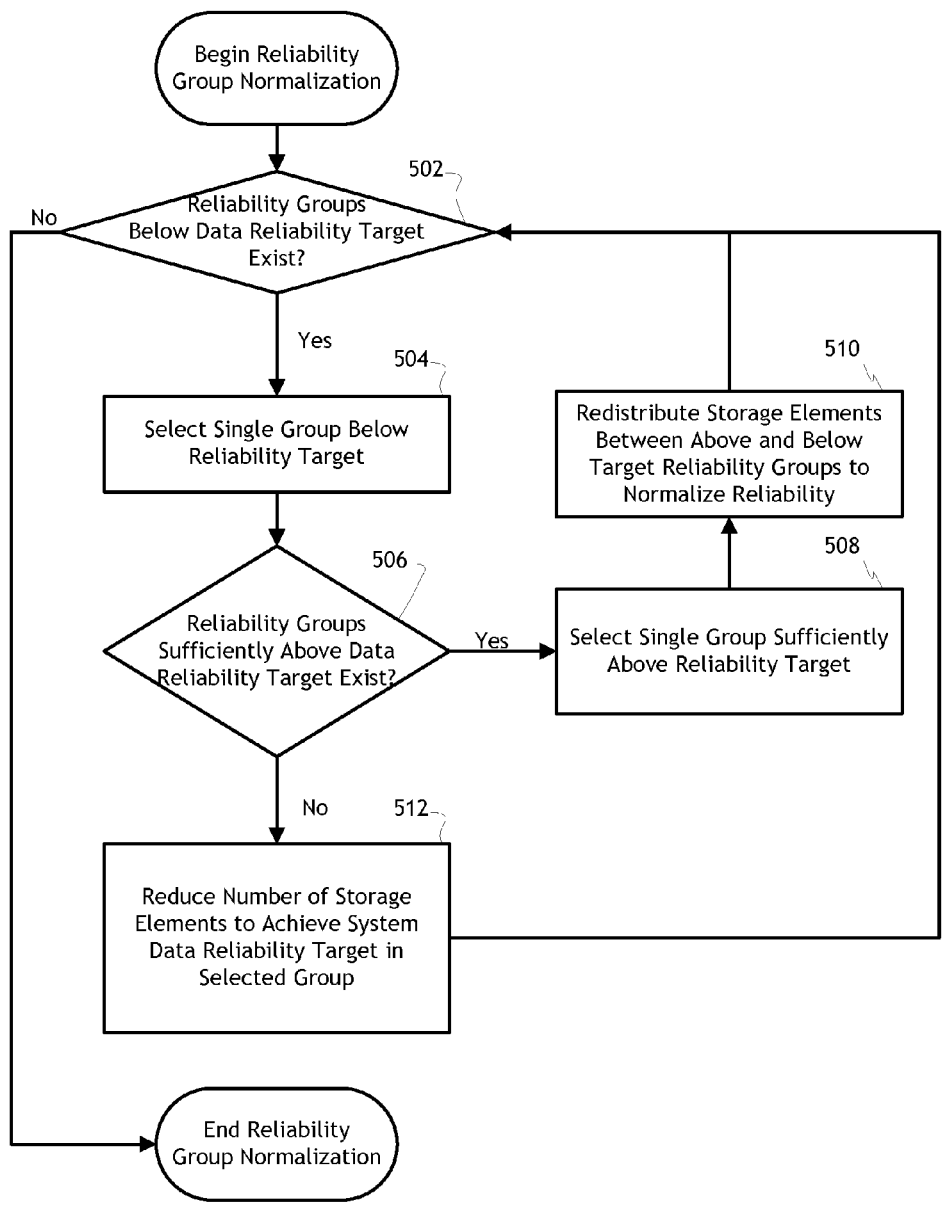
FIG. 5 is a flow diagram illustrating a method for re-distributing storage elements among stripe groups according to one embodiment.

FIG. 5 is a flow diagram illustrating a method for re-distributing storage elements among stripe groups according to one embodiment. The method begins in block 502, where the reliability module 156 determines whether there are stripe groups that are below the data reliability target in block 502. If so, in block 504, the method selects a single stripe group that is below the reliability target for corrective action. For example, the stripe group with the lowest reliability metric may be selected. However, the method shown in FIG. 5 eventually loops through and selects all such "below" reliability groups for corrective action. In block 506, the reliability module 156 determines whether there are reliability groups that are above the reliability target. If so, one of the groups that are above the reliability target is selected in block 508 for normalization, which is performed in block 510. The sufficiency determination ensures that an "above" group is sufficiently above the target so that it can be used to normalize the selected "below" group. For example, if the selected "below" group has a reliability metric of 55 and the reliability target is 60, the reliability module 156 may select an "above" group with a reliability target of at least 65 so that after normalization both groups can be above the target of 60.

In one embodiment, normalization in block 510 potentially involves moving data currently in selected storage elements assigned to a "below" group to elements in an "above" group that will replace those selected elements. For example, if blocks no. 1, 3, and 5 currently assigned to stripe group 1 are to be replaced by blocks 2, 4, 6 of stripe group 2, the normalization would involve moving data stored in blocks 1, 3, and 5 to blocks 2, 4, and 6, since blocks 2, 4, and 6 will be new members of stripe group 1. Because of this potential data movement, besides selecting a group in block 508 that is sufficiently above the target, the reliability module 156 in one embodiment also uses other selection preferences to select an "above" group, including a preference to select an "above" group with storage elements that are available for write operations, e.g., the storage elements have been garbage collected and are ready to be written to. In the above example, if blocks 2, 4, and 6 currently stores valid data, then the normalization process would need to take an additional step to move that valid data to storage elements of another stripe group and free up blocks 2, 4, and 6 to accommodate the data from blocks 1, 3, and 5. However, if blocks 2, 4, and 6 are already free, then this additional step would not be needed prior to normalization. Therefore, selecting a stripe group that is available for write operation minimizes data movement, and by extension, additional wear on the storage elements due to additional erase and write operations.

Other selection preferences for an "above" group may include the reliability metrics of the various above groups available for selection (with a preference to select the highest one for normalization in one embodiment), recent normalization activities of the groups (with a preference to select a group that has not been used for normalization recently). In one embodiment, after the completion of the action in block 510, the method returns to block 502 for further processing.

Returning to block 506, if it is determined that there are no stripe groups that are sufficiently above the data reliability target, in one embodiment, the reliability module 156 in block 512 reduces the number of storage elements in the selected "below" stripe group. In the example from FIG. 3, if there are no "above" stripe groups that can be used to normalize stripe group 5, then certain storage elements from stripe group 5 may be removed (un-assigned) from the group so the overall reliability metric of stripe group 5 is again above the target. In one embodiment, this can be achieved, for example, by removing those storage elements from the stripe group with low reliability (e.g., those that have high erase counts or other monitored conditions that would indicate potential failure). The removed storage elements will no longer be used for storing data, and the overall storage capacity of the entire storage subsystem is reduced.

In one embodiment, the reliability module 156 is configured to avoid taking the action in block 512 by periodically adjusting the reliability target as discussed above. The action taken in block 512 may be avoidable because a periodically adjusted reliability target moves in line with the degrading pattern of the storage elements in the stripe groups. In another embodiment, instead of taking the action described in block 512, the reliability module 156 adjusts the reliability target if it is determined at block 506 that no stripe groups are above the reliability target. In one embodiment, after the completion of the action in block 512, the method returns to block 502 for further processing.

Figure 6A:
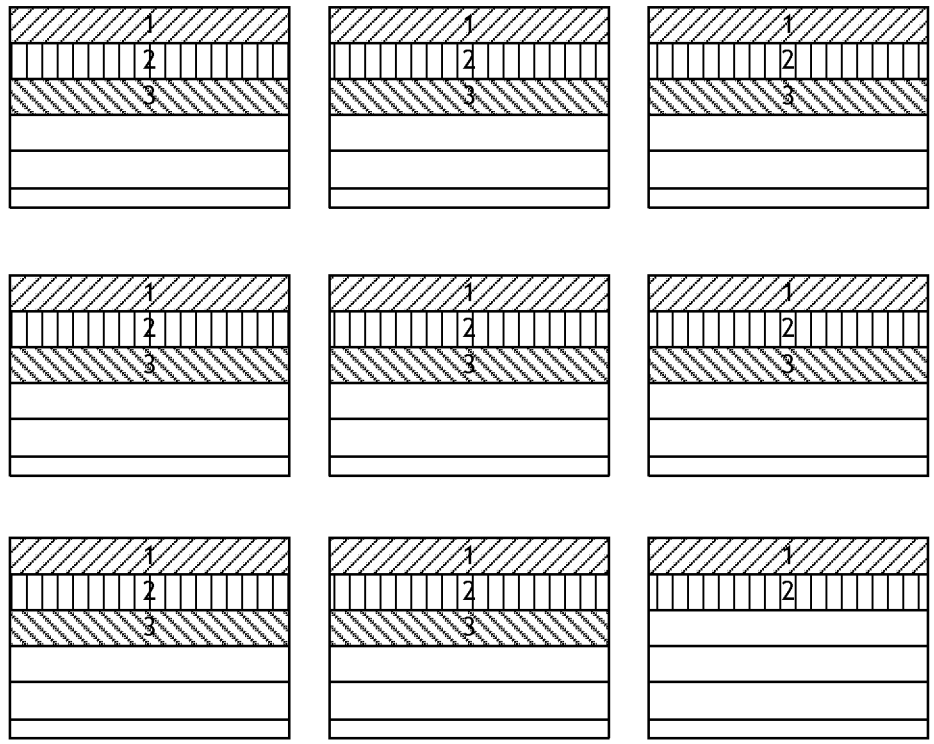
FIGS. 6A-6C are block diagrams illustrating examples of storage elements being re-distributed or removed according to one embodiment.
Figure 6B:
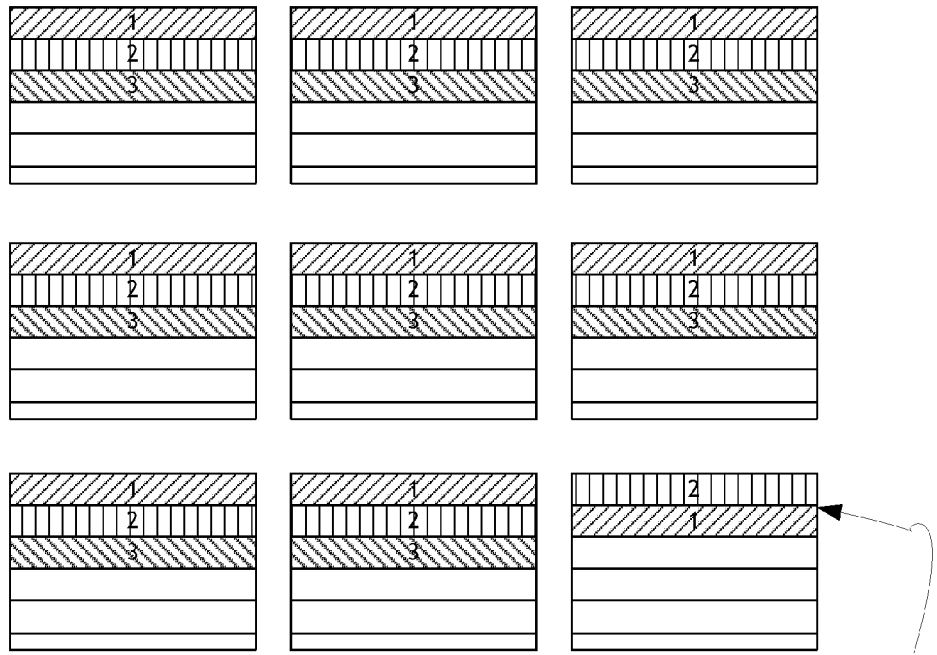
Figure 6C:
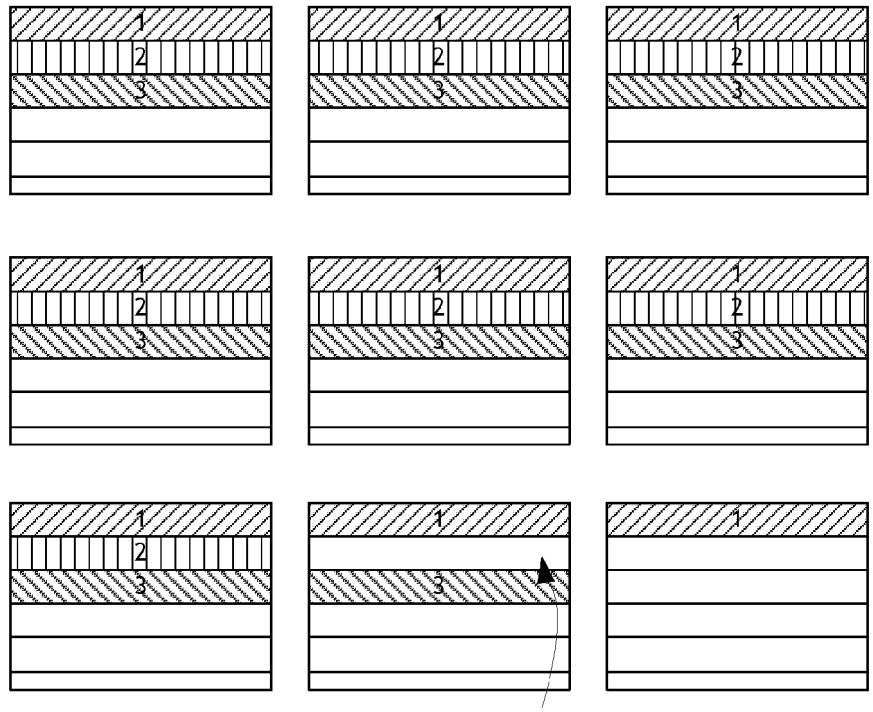

FIGS. 6A-6C are block diagrams illustrating examples of storage elements being re-distributed or removed according to one embodiment. FIG. 6A illustrates three example stripe groups 1, 2, and 3 prior to any corrective action. As shown, stripe groups 1 and 3 meet the reliability target (i.e., they are above the target) while stripe group 2 fails to meet the reliability target (i.e., it is below the target). FIG. 6B shows the same three stripe example groups after redistribution of elements (such as the action taken in block 510 discussed above). As shown, an element from stripe group 1 has been re-assigned to stripe group 2 while an element from stripe group 2 has been re-assigned to stripe group 1. After the re-distribution of the elements, stripe group 2 now meets the reliability target. Alternatively, instead of re-distributing the elements, FIG. 6C shows the same three stripe example groups after elimination of an element from stripe group 2 (such as the action taken in block 512 discussed above). The removed element is likely an element with low reliability, so that the overall reliability metric of stripe group 2 now meets the reliability target.

Conclusion

The features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method of enhancing data reliability in a solid state storage device, the method comprising:
    monitoring one or more conditions of a solid state storage device comprising a plurality of storage elements, the solid state storage device being configured to implement a data redundancy configuration with a plurality of stripe groups, each stripe group comprising a respective subset of the plurality of storage elements;
    determining a reliability metric for each of the stripe groups, the reliability metric being based at least on the one or more monitored conditions associated with individual storage elements associated with the respective stripe group; and
    in response to detecting that the reliability metric of a first of said stripe groups fails to satisfy a selected reliability target, removing at least one storage element from the first stripe group to cause an improvement in the reliability metric of the first stripe group.

2. The method of claim 1, wherein removing the at least one storage element from the first stripe group comprises:
    reassigning the at least one storage element to a second of said stripe groups that has a reliability metric that satisfies the selected reliability target.

3. The method of claim 1, wherein removing the at least one storage element from the first stripe group comprises:
    replacing the at least one storage element with at least one storage element from a second of said stripe groups that has a reliability metric that satisfies the selected reliability target.

4. The method of claim 3, wherein replacing the at least one storage element from the first stripe group with the at least one storage element from the second stripe group comprises:
    moving data stored in a storage element in the first stripe group to a storage element in a third of said stripe groups prior to replacing the at least one storage element from the first stripe group with the at least one storage element from the second stripe group.

5. The method of claim 1, wherein the monitored plurality of conditions comprise one or more of: a bit error count of a data access, an error correction code (ECC) error rate, a voltage reference level, an erase count, and a wear level.

6. The method of claim 1, wherein the selected reliability target is periodically adjusted in accordance with a desired level of probability of data loss for the solid state storage device.

7. The method of claim 1, further comprising:
    determining an order of the stripe groups by their associated reliability metrics.

8. The method of claim 1, wherein the storage elements comprise a plurality of pages, blocks, dies, or devices.

9. The method of claim 1, wherein the data redundancy configuration is a redundant array of independent disks (RAID) configuration.

10. A storage subsystem comprising:
    a non-volatile memory storage array configured to implement a data redundancy configuration with a plurality of stripe groups, the non-volatile memory storage array comprising a plurality of storage elements assigned to various of the plurality of stripe groups; and
    a controller configured to periodically monitor a plurality of conditions associated with the storage elements;
    wherein the controller is configured to:
        periodically determine a reliability metric for each of the stripe groups, the reliability metric being determined based at least in part on one or more of the monitored conditions associated with individual storage elements associated with the respective stripe groups; and
        in response to detecting that the reliability metric of a first of said stripe groups fails to satisfy a selected reliability target, replace a storage element from the first stripe group with a storage element from a second of said stripe groups that has a reliability metric that satisfies the selected reliability target to cause an improvement in the reliability metric of the first stripe group.

11. The storage subsystem of claim 10, wherein the controller is further configured to move data stored in a storage element in the first stripe group to a storage element of a third stripe group prior to replacing the storage element from the first stripe group with the storage element from the second stripe group.

12. The storage subsystem of claim 10, wherein the controller is further configured to replace a number of storage elements from the first stripe group with a number of storage elements from the second stripe group, the number sufficient to cause the first stripe group to have a reliability metric that satisfies the selected reliability target.

13. The storage subsystem of claim 10, wherein the storage elements comprise a plurality of pages, blocks, dies, or devices.

14. The storage subsystem of claim 10, wherein the monitored plurality of conditions comprise one or more of: a bit error count of a data access, an error correction code (ECC) error rate, a voltage reference level, an erase count, and a wear level.

15. The storage subsystem of claim 10, wherein the selected reliability target is periodically adjusted in accordance with a desired level of probability of data loss of the storage subsystem.

16. The storage subsystem of claim 10, wherein the controller is further configured to determine an order of the stripe groups by their associated reliability metrics.

17. The storage subsystem of claim 10, wherein the controller is further configured to replace at least one storage element from each stripe group with a reliability metric that fails to satisfy the selected reliability target with at least one storage element from a stripe group that has a reliability metric that satisfies the selected reliability target until each stripe group has a reliability metric that satisfies the selected reliability target.

18. The storage subsystem of claim 17, wherein the controller is further configured to:
in response to detecting the replacements do not cause each stripe group to attain a reliability metric that satisfies the selected reliability target, remove at least one storage element from at least one stripe group with a reliability metric that fails to satisfy the selected reliability target to cause the at least one stripe group to attain a reliability metric that satisfies the selected reliability target.

19. The storage subsystem of claim 10, wherein the data redundancy configuration is a redundant array of independent disks (RAID) configuration.

* * * * *